United States Patent [19]

Misev

[11] Patent Number: 5,086,087
[45] Date of Patent: Feb. 4, 1992

[54] COMPOSITION CONTAINING UV CURABLE UNSATURATED MONOMERS AND/OR OLIGOMERS, A PHOTOINITIATOR AND COLLOIDAL SILICA WITH AN ORAGNOSILANE COMPOUND, AND THE APPLICATION OF THIS COMPOSITION IN COATINGS

[75] Inventor: Tosko A. Misev, Zwolle, Netherlands

[73] Assignee: Stamicarbon B.V., Geleen, Netherlands

[21] Appl. No.: 328,562

[22] Filed: Mar. 24, 1989

[30] Foreign Application Priority Data

Mar. 25, 1988 [NL] Netherlands ............... 8800748

[51] Int. Cl.$^5$ ................................. C08J 3/28
[52] U.S. Cl. ........................... 522/84; 522/83; 522/148; 522/44
[58] Field of Search ............. 522/84, 148, 83, 44

[56] References Cited

U.S. PATENT DOCUMENTS 4,211,823  7/1980  Suzuki ..................... 428/412
4,372,835  2/1983  Chung et al. ............ 522/170
4,417,023  11/1983  Sinka .
4,478,876  10/1984  Chung ...................... 427/54.1

FOREIGN PATENT DOCUMENTS 2066278  7/1981  United Kingdom .
2113698  8/1985  United Kingdom .

OTHER PUBLICATIONS

Chemical Abstracts, vol. 97(14):111403f, General Electric Co., Photocurable Siloxane Coating Materials, 1981.

Primary Examiner—Marion E. McCamish
Assistant Examiner—Mark A. Chapman
Attorney, Agent, or Firm—Cushman, Daarby & Cushman

[57] ABSTRACT

The invention relates to a composition containing UV curable unsaturated monomers and/or oligomers, a photoinitiator and colloidal silica with an organosilane compound, a polyalkoxysilane being used as organosilane compound and the composition containing an acid catalyst.

8 Claims, No Drawings

COMPOSITION CONTAINING UV CURABLE UNSATURATED MONOMERS AND/OR OLIGOMERS, A PHOTOINITIATOR AND COLLOIDAL SILICA WITH AN ORAGNOSILANE COMPOUND, AND THE APPLICATION OF THIS COMPOSITION IN COATINGS

The invention relates to a composition containing UV curable unsaturated monomers and/or oligomers, a photoinitiator and colloidal silica with an organosilane compound, and the application of this composition in coatings.

Compositions containing UV curable unsaturated monomers and/or oligomers, a photoinitiator, colloidal silica and a silane compound are described in GB-A-2089826. These compositions are used in coatings that are applied onto plastic substrates. The automotive industry is currently looking for transparent, scratch resistant coatings that can be applied onto transparent thermoplastic polymers, in particular onto polycarbonate. These transparent polymers are used, mainly in the form of sheets, to replace glass plates. Also in other branches of industry it is tried to replace glass by unbreakable, lightweight, transparent plastics, such as polycarbonates, poly(methylmeth)acrylates, cellulose esters, polystyrene and polyvinyl chloride. However, these plastics have the drawback that their surfaces are easily damaged and that they are little resistant to solvents. In order to eliminate some of these drawbacks it is therefore necessary to coat these plastics.

The object of the invention is to provide a composition which can be applied in coatings on such plastic substrates.

According to the invention a composition containing UV curable unsaturated monomers and/or oligomers, a photoinitiator and colloidal silica with an organosilane compound is characterized in that polyalkoxysilane is used as organosilane compound and in that the composition contains an acid catalyst.

Colloidal silica, applicable in the composition according to the invention, can be obtained from colloidal hydrophilic silica.

Colloidal hydrophylic silica is a dispersion of finely distributed $SiO_2$ in a dispersing agent such as water or ethylene glycol. Colloidal hydrophylic silica can be used both in its acidic and its basic form.

The hydrophylic colloidal silica can be made organophilic with an organosilane compound by grafting a polyalkoxysilane on hydrophylic silica particles, giving the following reaction (in the case of tetraalkoxysilane) in water-free medium between the hydrophilic colloidal silica and the polyalkoxysilane:

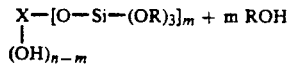

where:
X = hydrophilic colloidal silica particle, and
R = alkylgroup with 1-10 carbon atoms According to a preferred embodiment of the invention, tetraalkoxysilane, in particular tetramethoxysilane, is chosen as polyalkoxysilane. Other suitable tetraalkoxysilanes are tetraethoxysilane, tetrapropoxysilane, tetrabutoxysilane or mixtures thereof. Further, di- and oligomers are suitable, such as for instance di- and oligomers obtainable by oligomerization of the above-mentioned alkoxysilanes under the influence of water.

The condensation product thus obtained is mixed with unsaturated UV curable monomers and/or oligomers.

Suitable unsaturated monomers are for instance mono- or polyfunctional (meth)acrylic acid esters or amides, mono- or polyfunctional vinyl compounds, mono- or polyfunctional allylic esters or ethers, esters of unsaturated diacids, acrylic acid and methacrylic acid.

Suitable unsaturated oligomers are for instance (meth)acrylic acid urethanes, (meth)acrylic acid epoxy compounds, (meth)acrylic acid polyesters or unsaturated polyesters on the basis of maleic acid, fumaric acid or itaconic acid, allyl ethers of polyfunctional alcohols or allyl alcohol.

The weight ratio of unsaturated double bond containing monomers and/or oligomers:colloidal silica is preferably between 20:1 and 1:20.

The coatings composition according to the invention cures on the one hand due to the radical polymerization in the presence of a photoinitiator of the UV curable monomers and/or oligomers that contain unsaturated double bonds, and on the other the curing under the influence of moisture in the presence of an acid catalyst of colloidal silica through polycondensation of polyalkoxysilane groups. These curing reactions take place on the substrate at room temperature.

Suitable photoinitiators are usual initiators, such as ketones and mixtures of ketones, for instance benzophenone, chlorobenzophenone, 4-benzoyl-4-diphenylsulphide, 4-phenyl-benzophenone, diphenylene ketone oxide (derivatives), acetophenone (derivatives) and/or benzoin (derivatives) in quantities between 0.1 and 10 wt. %.

Suitable acid catalysts are for instance paratoluenesulphonic acid, dodecylsulphonic acid, naphthalenesulphonic acid, sulphuric acid, phosphoric acid and/or hydrochloric acid in quantities between 0.1 and 10 wt. %. A latent catalyst giving free acid under the influence of UV light can also be used as acid catalyst. An example of such a latent catalyst is a catalyst according to the formula:

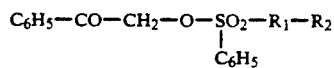

where:
$R_1$ = phenylene or naphthalene
$R_2$ = $CH_3$, $C_2H_5$, $C_3H_7$, $C_4H_9$ or $C_{12}H_{25}$.

A preferred embodiment of the invention is the process for the preparation of a substrate with a coating, consisting of application onto a substrate on the basis of transparent polymers of a composition comprising UV curable unsaturated monomers and/or oligomers, a photoinitiator and colloidal silica with an organisilane compound, and allowing this composition to cure under the influence of UV light, wherein as organosilane compound a polyalkoxysilane is used and the composition also includes an acid catalyst, the colloidal silca being cured under the unfluence of moisture.

The composition according to the invention may further contain additives such as for instance antistatics, stabilizers, surfactants and flow agents. The mixture obtained can be applied to the plastic substrate by the usual coating methods, such as roller coating or spray coating.

According to GB-A-2113698, the silica containing material has at least one mercapto group which participates in the reaction of polymerisation of the acrylic monomers during the curing of the coating, being thus attached to the acrylic chain. In the present invention however only colloidal silica with grafted alkoxysilane groups is present, which do not undergo reaction with the acrylates. They form a crosslinked network by moisture curing under acidic conditions.

The invention will be further elucidated with reference to the following examples, without however being restricted thereto.

EXAMPLE I

Preparation of Colloidal Silica with an Organosilane Compound 375 g of an aqueous dispersion of an acid type of hydrophilic colloidal silica with 34% by weight $SiO_2$ and a particle size of 20 nanometers maximum (Nalco-ag-1034 A-Nalco Chem. Co.) was mixed with 500 g ethyleneglucol monoethylether. The mixture was distilled until the water content was less than 0.1% by weight. 490 g of a dispersion of colloidal silica in ethyleneglycol monoethylether with a $SiO_2$ content of 25% by weight was obtained. Next, 100 g of the dispersion obtained was mixed with 26 g tetramethoxysilane (Dynasil M-Dynamit Nobel) and kept at room temperature for 40 hours, after which the product was placed in an evaporation device. Methanol and ethyleneglycol monoethylether were distilled off. In the form of a viscous liquid containing 58% by weight $SiO_2$, 60 g organophilic silica was obtained.

EXAMPLES II-IV 77 parts by weight of a mixture consisting of pentaerytritoltetraacrylate, vinylpyrrolidone and dimethoxyphenylacetophenone (weight ratio 70:20:3), 33 parts by weight of organophilic colloidal silica as in Example I (which corresponds to 20 parts by weight of $SiO_2$) and 3 parts by weight of paratoluenesulphonic acid in 40% by weight ethanol solution were admixed. This coating composition was applied onto a polycarbonate substrate with a thickness of 6 μm. The curing was effected with UV light (mercury lamp, 80 W/cm) with a total dosage of 17.5 J/cm². The abrasion resistance was subsequently determined with the so-called Taber Abraser Test (ASTM D 1044-85). Using an abrasion wheel (CS-10 F) charged with 500 g the haze was determined after 50, 100, 500 and 1,000 rotations, respectively, immediately upon curing, after 2 weeks and 6 weeks, respectively. The results were expressed in Delta Haze (ΔH), indicating the difference between a blank and a sample subjected to the Taber Abraser Test.

TABLE 1

| Ex. | Time | ΔH (%) after number of rotations | | | |
|---|---|---|---|---|---|
| | | 50 | 100 | 500 | 1000 |
| II | immediately upon curing | 0.8 | 2.3 | 6.4 | 14.8 |
| III | 2 weeks | 0.9 | 3.9 | 8.4 | 13.3 |

TABLE 1-continued

| Ex. | Time | ΔH (%) after number of rotations | | | |
|---|---|---|---|---|---|
| | | 50 | 100 | 500 | 1000 |
| IV | 6 weeks | 0.9 | 2.4 | 5.3 | 7.3 |

From this it appeared that especially the ΔH of the sample subjected to the test with 1000 rotations was improved considerably after 6 weeks (additional crosslinking of the colloidal silica due to the longer period of time).

EXAMPLES V-VII

Coating compositions were prepared by adding, respectively, 5, 10 and 15 wt. %. colloidal silica (relative to $SiO_2$ content) prepared according to Example I to a UV curable oligomer mixture consisting of trimethylolpropanetriacrylate and vinylpyrrolidone (in a weight ratio of 80:20). Further, 3 wt. % dimethylphenylacetophenone as UV curing catalyst and 3 wt. % paratoluenesulphonic as a 40% solution in ethanol as acid catalyst were added. The curing took place as described in Examples II-IV.

The ΔH measurements gave the following results after 6 weeks:

TABLE 2

| Ex. | % $SiO_2$ | ΔH (%) after number of rotations | | |
|---|---|---|---|---|
| | | 50 | 100 | 500 |
| V | 5 | 2.4 | 4.3 | 25.5 |
| VI | 10 | 3.0 | 4.4 | 18.2 |
| VII | 15 | 3.2 | 6.0 | 14.2 |

From this it appeared that an increase in the quantity of $SiO_2$ resulted in lowering of the ΔH at a greater number of rotations.

I claim:

1. Composition comprising UV curable unsaturated monomers and/or oligomers, a photoinitiator and colloidal silica with a polyalkoxysilane and an acid catalyst.

2. Composition according to claim 1, wherein the polyalkoxysilane is a tetraalkoxysilane.

3. Composition according to claim 2, wherein the tetraalkoxysilane is tetramethoxysilane.

4. Composition according to claim 1, wherein a weight ratio of unsaturated double bond containing monomers and/or oligomers:colloidal silica is between 20:1 and 1:20.

5. Composition according to claim 1, wherein the acid catalyst is a latent catalyst whereby free acid under the influence of UV light is given.

6. Coating comprising a composition according to claim 1.

7. Substrate coated with a coating according to claim 6.

8. Process for preparing a substrate on a coating, comprising the steps of:
applying onto a substrate a transparent polymer composition comprising UV curable unsaturated monomers and/or oligomers, a photoinitiator and colloidal silica with a polyalkoxysilane and an acid catalyst; and
allowing this composition to cure under the influence of UV light, and the colloidal silica to cure under the influence of moisture.

* * * * *